United States Patent
Pesonen et al.

(10) Patent No.: US 9,886,865 B2
(45) Date of Patent: Feb. 6, 2018

(54) PROVIDING ENHANCED EXPERIENCE BASED ON DEVICE LOCATION

(71) Applicant: ROVIO ENTERTAINMENT LTD., Espoo (FI)

(72) Inventors: Mika Pesonen, Espoo (FI); Johannes Rajala, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 71 days.

(21) Appl. No.: 14/315,492

(22) Filed: Jun. 26, 2014

(65) Prior Publication Data

US 2015/0378547 A1    Dec. 31, 2015

(51) Int. Cl.
*G06F 3/033* (2013.01)
*A63F 13/00* (2014.01)
*G09B 5/00* (2006.01)

(52) U.S. Cl.
CPC ..................... *G09B 5/00* (2013.01)

(58) Field of Classification Search
CPC ...... G06F 15/02; G06F 15/0208; G06F 3/033; G06F 3/03542; G06F 3/03545; G06F 3/042; G06F 3/0317; G06F 3/0488; G06F 3/04847; G06F 3/041; G06F 2203/04808; A63F 9/00; A63F 2009/2457; A63F 2009/2458; A63F 2009/246; A63F 13/00; A63F 13/21; A63F 13/213; A63F 13/214; A63F 13/2145; A63F 13/25; A63F 13/50; A63F 13/53; A63F 13/537; A63F 13/5375; A63F 13/55; A63F 13/56

USPC .......................................................... 345/156
See application file for complete search history.

(56) References Cited

U.S. PATENT DOCUMENTS

| | | | |
|---|---|---|---|
| 8,737,908 B1 | 5/2014 | Smith | |
| 2005/0186884 A1 | 8/2005 | Evans | |
| 2009/0000832 A1* | 1/2009 | Marggraff | G06F 3/03545 178/19.01 |
| 2009/0104988 A1 | 4/2009 | Enge et al. | |
| 2009/0135153 A1* | 5/2009 | Narusawa | G06F 1/3262 345/173 |
| 2010/0085471 A1* | 4/2010 | Craven-Bartle | G06F 3/03545 348/371 |
| 2013/0123009 A1 | 5/2013 | Maharbiz et al. | |
| 2013/0196766 A1 | 8/2013 | Leyland et al. | |
| 2014/0053111 A1* | 2/2014 | Beckman | G06F 3/04812 715/856 |
| 2014/0118310 A1* | 5/2014 | Black | G06F 3/03545 345/178 |

FOREIGN PATENT DOCUMENTS

| | | |
|---|---|---|
| WO | 9603188 A1 | 2/1996 |
| WO | WO 2009/086308 A1 | 7/2009 |
| WO | 2014/013492 A1 | 1/2014 |

* cited by examiner

*Primary Examiner* — Lisa Landis
(74) *Attorney, Agent, or Firm* — Squire Patton Boggs (US) LLP (57) ABSTRACT

Providing enhanced experience is described. Information obtained based on a location of an controller device on a controller surface is used to provide enhancing information.

14 Claims, 6 Drawing Sheets

PROVIDING ENHANCED EXPERIENCE BASED ON DEVICE LOCATION

BACKGROUND

Field

Examples of the present invention relate to enhancing for example reading or playing experience with physical objects. More specifically, the examples of the present invention relate to methods, apparatuses, systems and related computer program products for enhancing user experience.

Description of the Related Art

Consumers nowadays use more and more digital media when reading, playing, learning etc. Still some consumers prefer physical form; reading their books and magazines on paper or play games on physical boards etc. There has been some attempts on combining the digital media with the physical form. For example PCT/US2008/088027 presents a solution for synchronisation of sensory simulation with reading experience by providing sensory stimulation in relation to reader's location with respect to printed material. The solutions only provide for example audio and/or video stimulation to the reader but does not allow interaction. Therefore there is a need for advanced approaches for enhancing user experience.

SUMMARY

According to one example embodiment, a method comprises determining a first location of a controller device on a controller surface, obtaining information relating to the first location of the controller device and storing the information relating to the first location. The method further comprises determining a second location of the controller device on the controller surface, obtaining information relating to the second location of the controller device and storing the information relating to the second location. The method also comprises determining enhancing information based on the information relating to the first location and the information relating to the second location.

According to another example embodiment, a system comprises a controller surface, wherein the controller surface contains location information and a controller device, wherein the controller device determines its first location on the controller surface and stores information relating to the first location.

The controller device further determines its second location on the controller surface and stores information relating to the second location. The system also comprises a display device, wherein the display device determines enhancing information based on the information relating to the first location and the information relating to the second location.

According to another example embodiment, an apparatus comprises means for determining a first location of the apparatus on a controller surface, obtaining information relating to the first location of the apparatus and storing the information relating to the first location. The apparatus further comprising means for determining a second location of the apparatus on the controller surface, obtaining information relating to the second location of the apparatus and storing the information relating to the second location. The apparatus also comprises means for determining enhancing information based on the information relating to the first location and the information relating to the second location.

According to another example embodiment, a computer program product including one or more sequences of one or more instructions which, when executed by one or more processors, cause an apparatus to at least perform the steps of at least determining a first location of a controller device on a controller surface, obtaining information relating to the first location of the controller device and storing the information relating to the first location.

The apparatus further performing steps of determining a second location of the controller device on the controller surface, obtaining information relating to the second location of the controller device and storing the information relating to the second location. The apparatus also performing step of determining enhancing information based on the information relating to the first location and the information relating to the second location.

BRIEF DESCRIPTION OF THE DRAWINGS

The embodiments of the invention are illustrated by way of example—not by way of limitation, in the figures of the accompanying drawings.

DETAILED DESCRIPTION

The following embodiments are exemplary only. Although the description may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are suitable for the example embodiments and may not be specifically described herein.

Examples methods, systems, apparatuses and a computer program products are presented for enhancing user experience.

As used herein, the term "controller surface", refers to a surface, which may be for example a page or pages of a book, a map, a playing board, a play mat or any other suitable surface. The controller surface may be for example flat, concave, rounded etc. One controller surface or more than one controller surfaces may form objects like a cube, pyramid, ball, cylinder and so on. The controller surface may comprise human readable information, like pictures, numbers and text.

The controller surface may also comprise machine readable information, such as text or numbers, stored for example on NFC (near field communications) tags or other RF (radio frequency) based suitable solutions. Machine readable information may further be stored using magnetic storage, printed electronics, inductive communications and other suitable means. The information may be read-only, but in some embodiments the controller surface may also comprise means for storing information, when in addition to read-only writing of information is possible, too.

The controller surface may further comprise an optically readable, non-repeating, dot pattern, which can be used to define location on the controller surface. One, several or each location on the controller surface may be defined also using other suitable technologies. The location may be defined by sensing RF, magnetic field, inductive/resistive signals and using other suitable sensors. For example the controller surface may comprise one or more NFC tags on certain locations or the controller surface may comprise a matrix of NFC tags covering at least one area of the controller surface. In some embodiments the matrix of NFC tags may cover the whole controller surface, when for example a location of an object on the surface may be determined and traced.

As used herein, the term "controller device", refers to a computing device which may be used with the controller surface. The controller device may comprise a processor, a battery and means for communication. The communication means may comprise for example Bluetooth, Bluetooth Low Energy, WLAN, infrared or other suitable wireless or wired communication methods. The communication means can be used to interact with other controller devices or other computing devices.

The controller device may further comprise means to read information stored on the controller surface or write information on the controller surface. The controller device may comprise means to read or define its location on the controller surface. In an example embodiment the location of the controller device on the controller surface is defined using dot pattern, the controller device may comprise a camera or other suitable optical sensing device. The dot pattern may be for example printed on the surface. The dot pattern may be non-repeating enabling ability to determine current page, and location on the page. The dot pattern may be printed using any suitable colour visible or invisible for humans.

In some example embodiments the controller device may further comprise at least one microphone, speaker, LED or other light source, sensors (accelerometer, gyroscope, compass . . . ) general purpose input/output (GPIO) etc. In an example embodiment the controller may comprise wide variety of functionalities typical for a modern smart phone or other advanced computing device.

As used herein, the term "application" refers to software that contains such instructions that, when executed by one or more processors, causes a computer to perform tasks. The application may also be referred as software application, application program, application software, app and so on. It is to be noted that in at least some of the example embodiments also system software providing a platform for running the application can be considered functionally similar to the application. Alternatively, or in addition to, also set of instructions based on HTML5 mark-up language may be considered as an application.

As used herein, the term "display device" refers to a computing device and it may be for example a laptop, desktop computer, graphics tablet, cellular phone, multimedia system of a vehicle, an arcade gaming device, an electronic noticeboard, a television, or any other device with capabilities for running at least one application and interacting with at least one controller device.

As used herein, the term "server" refers to a physical or virtual computational entity capable of enhancing information and to perform computational tasks. The term server may refer to one entity or a group on entities configured to operate jointly with capabilities for running an application and interacting with at least one controller device and/or display device.

While various aspects of the invention are illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

Figure 1:
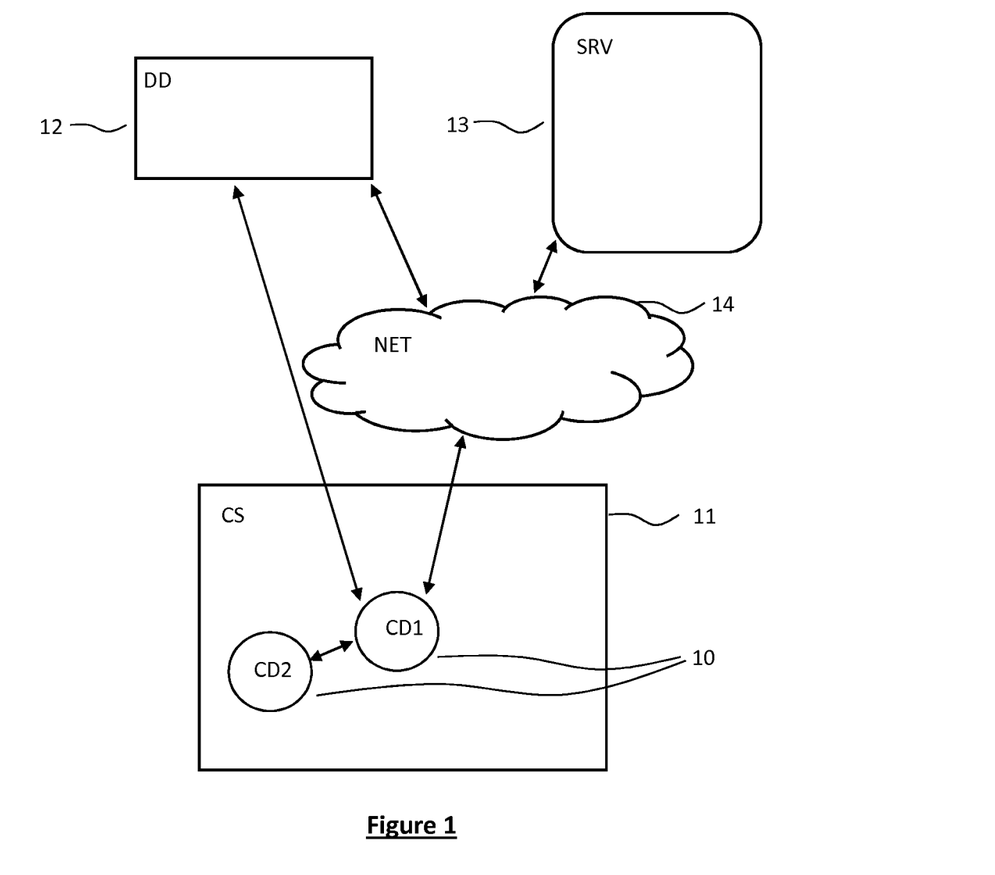
FIG. 1 illustrates a simplified arrangement where at least some example embodiments may be embodied.

FIG. 1 is a diagram of a network system capable of providing architecture for providing enhanced user experience. The illustrated example network system comprises two controller devices 10 (CD1, CD2), a controller surface 11 (CS), a display device 12 (DD), a server 13 (SRV) and network 14 (NET). The network 14 represents here any combination of hardware and software components that enables a process in one communication end point to send or receive information to or from another process in another, remote communication endpoint. The network 14 may be, for example, a personal area network, a local area network, a home network, a storage area network, a campus network, a backbone network, a metropolitan area network, a wide area network, an enterprise private network, a virtual private network, or a combination of any of these. The example network system of FIG. 1 is a simplified illustration depicting two controller devices 10, one controller surface, one display device 12 and one server 13. The number of the controller devices 11, display devices 12 and servers 13 may vary and in some example embodiments some of the elements may be non-existing. For example some embodiments of the current invention may be carried out without any of the controller surface 11, display device 12, server 13 or network 14.

Arrows between the elements in FIG. 1 illustrate possible connectivity of the elements. Any of the controller device 10, display device 12 and server 13 may be connected to the network 14, which allow them to exchange messages between them. In some example embodiments the connectivity may be utilised without the network 14 by using direct connection for example between two, or more controller devices 10 and display devices 12.

Figure 2:
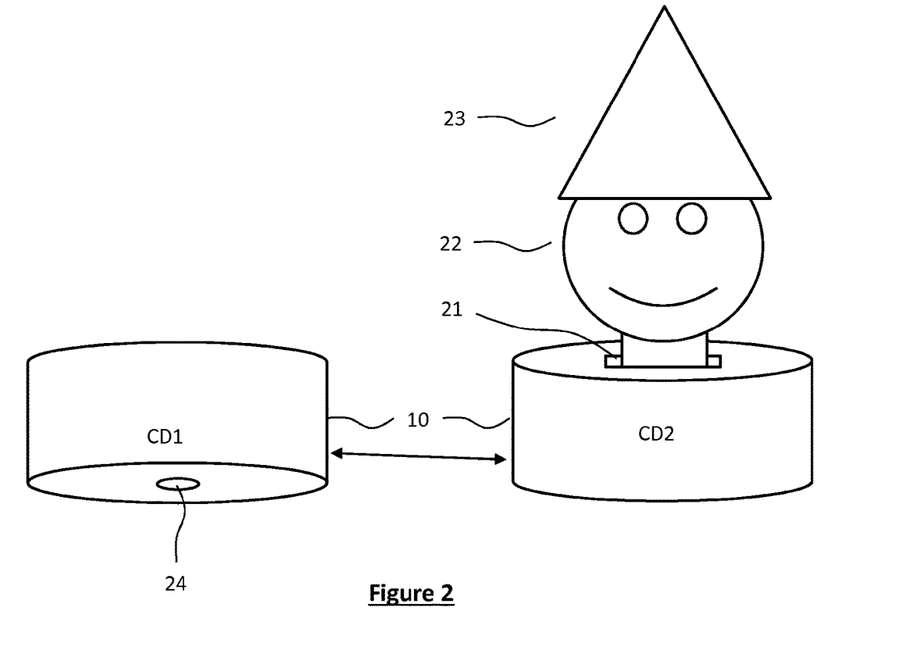
FIG. 2 is a flow chart illustrating an example embodiment.

FIG. 2 illustrates example controller devices 10, wherein the controller device 11 (CD2) comprises a socket 21, an add-on part 22 and an accessory 23. Any of the socket 21, the add-on part 22 or the accessory 23 may comprise means to detect existence of each other's. The existence may be detected by using mechanical switches, connectors or sensors detecting magnetic/inductive/rf etc. signals. According to one example embodiment NFC tags may be used to store and share information.

Any of the add-on part 22 or the accessory 23 may further comprise memory for storing information and means to exchange information between each other's or the controller device 10. In some example embodiments there may be more than one socket 21 in the controller device, when more than one add-on parts 22 may be attached to the controller device 10. Also more than one accessories 23 may be attached to the add-on part 22.

FIG. 2 illustrates another controller device 10 (CD2). The controller device 10 comprises an example arrangement with a sensor 24 in the bottom. The sensor 24 may detect signals and/or information from the controller surface 11. The sensor 24 may be for example an NFC reader or an optical sensor, like camera, reading information from the controller surface 11. In some example embodiment several sensors 24 may be arranged to the controller device 10.

Figure 3:
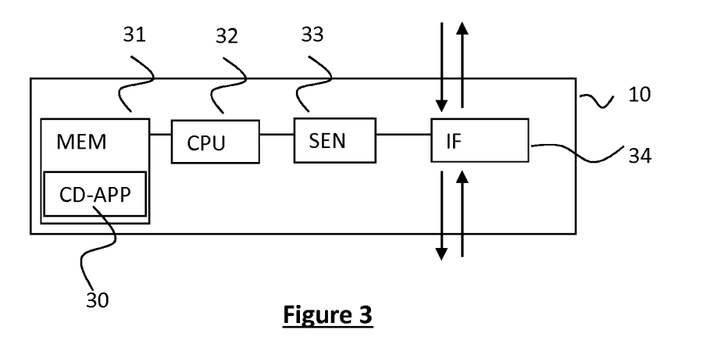
FIG. 3 illustrates a block diagram of an example controller device.

FIG. 3 illustrates a simplified example block diagram of the controller device 10. The controller device 10 comprises at least one controller device application 30 (CD-APP), which can be any kind of application or a set of applications running on the controller device 10. The controller device 10 may further comprise a memory 31 (MEM) for storing the controller device application 30 and other information. The memory 31 may comprise volatile or non-volatile memory, for example EEPROM, ROM, PROM, RAM, DRAM, SRAM, firmware, programmable logic, etc. The controller device 10 may further comprise one or more processor units 32 (CPU) for running the controller device application, at least one sensor 33 (SEN) and an interface 34 (IF). In addition the controller device 10 may comprise various input/output and other components like a battery which are not illustrated in FIG. 2.

The controller device application 30 may comprise for example software for controlling reading information from the sensor 33 and sending/receiving messages via interface 34. In addition the device application may comprise software for controlling a game, a messaging application, a learning application, a picture-, video-, text-, worksheet- etc. editor, music or video player and so on.

Figure 4:
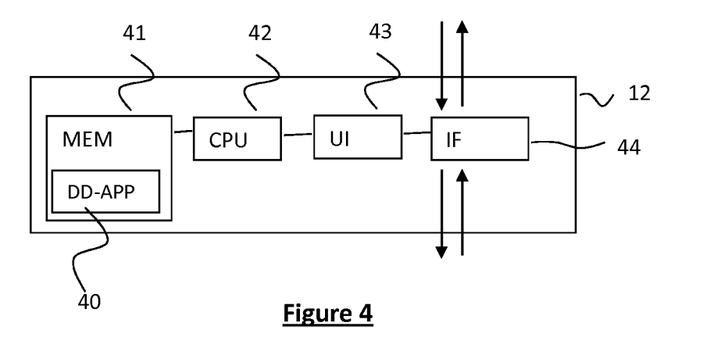
FIG. 4 illustrates a block diagram of a display device.

FIG. 4 illustrates a simplified example block diagram of the display device 12. The display device 12 may comprise a memory 41 (MEM) for storing a display device application 40 (DD-APP). The memory 41 may comprise volatile or non-volatile memory, for example EEPROM, ROM, PROM, RAM, DRAM, SRAM, firmware, programmable logic, etc. The display device may further comprise one or more processor units 42 (CPU) for processing instructions and running computer programs, like the display device application 40, an user interface 43 (UI) for giving instructions to the computer programs and presenting information to a user and an interface unit 44 (IF) for sending and receiving messages.

Providing enhanced user experience to a user may deepen a story told in a book, playing a game, learning and other appliances. In one example use-case a student is working on a project. The student is using a controller device 10, which may be for example shaped as a pen and a controller surface 11, which may be for example a school book. The student goes through the school book studying information on the pages and finding enhancing information available in certain parts of the pages. When availability of enhancing information is indicated to the student the controller device 10 (pen) may be placed on it and the controller device 10 sends location information to the display device 11, which may be for example the student's tablet computer. The location information is received at the display device 11 and enhancing information associated with the location is displayed to the student.

The indication of the enhancing information may include textual information on the page like "touch here for further information", or an intuitive picture giving the same information. In some embodiments availability of the enhancing information may be non-visible and found only by using the controller device 10, which may indicate the availability of the enhancing information using means like vibration, light, sound, sending message to the display device 12 or server 13 etc.

In addition to displaying the enhancing information the student may be given a task, for example solving a mathematical problem, completing grammar rules and so on. The student may carry out the task touching areas on the surface 11 with the controller device 10. In addition to touching carrying out the task may include writing, drawing etc. on the surface 11. In addition the student may use the display device 12 to receive the enhancing information, but also to input information. Progress information of the task may be stored on the student's profile at any time automatically or initiated by the student and the task may be continued using the stored progress information. The profile may be stored for example on the controller device 10, the display device 12 or the server 13. Whole learning process may be stored to the profile and a summarising presentation may be created according to the learning process. In a further learning example two or more students may be given a teamwork and each of the students may carry-out their share of the team work individually and exchange information each student has collected and combine completed achievements.

Figure 5A:
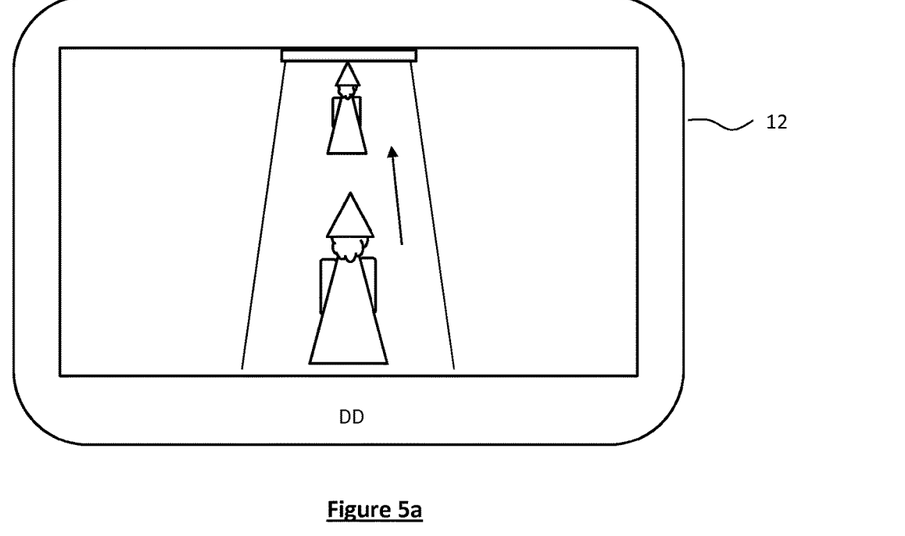
FIGS. 5a and 5b illustrate a simplified example embodiment of the invention.
Figure 5B:
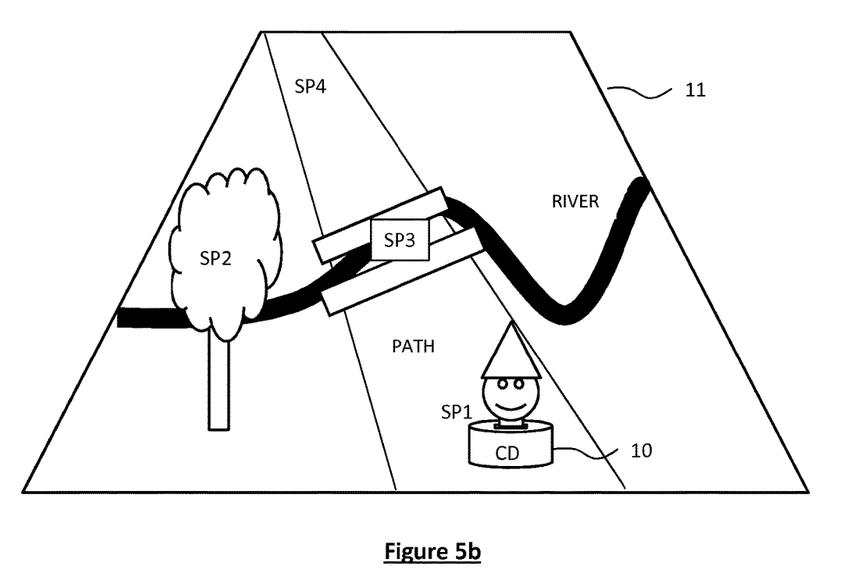

Let us consider another example in the area of gaming looking at pictures 5*a* and 5*b*. FIG. 5*b* illustrates a playing board (controller surface 11) with a path, a river, a tree and a bridge illustrated. SP1, SP2, SP3 and SP4 represent story points which are important for proceeding in the game. The playing board may be made of cardboard or paper and it may be one page of a book. The playing board may comprise dot pattern everywhere or just around the story points SP. User launches the display device application 40 and activates the controller device 10. The display device 12 may be for example a tablet computer.

The user is using the controller device 10 on the playing board and is facing a problem of crossing the river in front. There is a bridge going over the river but one plank is missing making it impossible to walk over the bridge. The user moves the controller device 10 along the path on top of the first story point (SP1). The controller device 10 detects its location on the playing board and sends the location information to the display device 12. On the screen of the display device 12 is shown an animation of a character walking towards the bridge, FIG. 5*a*. In an example embodiment the location of the controller device 10 is traced and corresponding location is shown on the display device 12 simultaneously. Some audio or other effects may be played or shown, too.

Next the user needs to figure out how to cross the river. The user searches for next story point and finds the second story point SP2 in the tree on the left side of the path. Again the controller device 10 detects its location on the playing board and sends the location information to the display device 12. New animation of the character climbing to the tree is shown and information about the user having found the story point 2 is stored to the user's profile.

Keeping the controller device on the tree the missing plank is found and it can be dragged to its place between other two planks. Installing the missing plank may include some special task which needs to be conducted using the controller device 10 or the display device 12 in the third story point SP3. When the bridge is fixed the character is able to cross the bridge and proceed towards the fourth story point SP4 and exit this playing board page and enter the next one.

The game character may depend on which kind of add-on part 22 and accessory 23 is being used. In the example of FIGS. 5*a* and 5*b* a "human" add-on part 22 is attached to the controller device 10. The controller device 10 is able to detect and identify the "human" add-on part 22 and sends a message to the display device 12. Display device application 40 receives the message and configures the animation accordingly and the animated character is displayed as a human character.

The animated character can be anything from a person, to an animal, a vehicle, a plant, a toy etc. according to the add-on part 22. For example some game levels may be entered only by a certain character and some other levels by any character but only with a certain accessory. The add-on part 22 further has an accessory 23 attached to it. In FIGS. 5a and 5b, as well as in FIG. 2, the accessory 23 is a wizard's hat. In this example the hat turns the character into a wizard and the animated character on the display device 12 is a wizard accordingly. Wizard-character may have some special skills in the game and some tasks may be achieved only by a wizard.

All the information described in the gaming example above may be stored in the memory 31 of the controller device 10, in the memory 41 of the display device 12, in the server 13, in the add-on part 22, in the accessory 23 or other suitable place where the information is accessible. The stored information may be associated with the user, the add-on part 22, the accessory 23 or the controller device 10. Therefore the information may be accessed and utilised again in another gaming session by for example installing the add-on part 22 and/or accessory 23 to another controller device 10. For example the user may play the game at home and continue at a friend's place by just bringing the add-on part 22, accessory 23 or the controller device along. The information may include achievements, collectibles, points etc.

In addition to the storing of the game information users may exchange or transfer information they have gathered during playing. In the gaming use case explain above the user have gathered information about where to find the missing plank and how to fix the bridge. The user might want to exchange such game related information with another user, controller device 10, add-on part 22 or accessory 23. Exchange or transfer of the gathered information may be triggered for example by detecting another controller device 10 in proximity. After the gathered information is transferred the other controller device may utilize it, too. According to the example the second user would not need to solve the problem of how to cross the bridge because the gathered information is received in the information exchange.

In an example embodiment the gathered information is stored on the controller devices 10 and it is shared using a short distance communication method like Bluetooth, NFC or other suitable method.

In another example embodiment the gathered information is stored on the server 13 and it is first downloaded to the controller devices 10 and then shared using a short distance communication method like Bluetooth, NFC or other suitable method.

In another example embodiment the gathered information is stored on the server 13 and it is shared at the server 13. The sharing may be triggered by using proximity sensors.

In another example embodiment the gathered information is stored on the add-on part 22 and it is shared directly between another add-on part 22 using a short distance communication method like Bluetooth, NFC or other suitable method.

In another example embodiment the gathered information is stored on the accessory 23 and it is shared directly between another accessory 23 using a short distance communication method like Bluetooth, NFC or other suitable method.

In another example embodiment the gathered information is stored on the add-on part 22 and it is shared via one or more controller device 10 between another add-on part 22 using a short distance communication method like Bluetooth, NFC or other suitable method.

In another example embodiment the gathered information is stored on the accessory 23 and it is shared via one or more controller device 10 between another accessory 23 using a short distance communication method like Bluetooth, NFC or other suitable method.

In another example embodiment sharing the gathered information is indicated to the user using sounds, lights, vibration or other suitable means. The sharing may emulate communication between two or more controller devices 10 by using for example speech synthesiser.

As used herein, term "sharing" information refers to sending a message from one or many sources to one or many targets, uploading or downloading information to/from another device, synchronising information etc.

Figure 6:
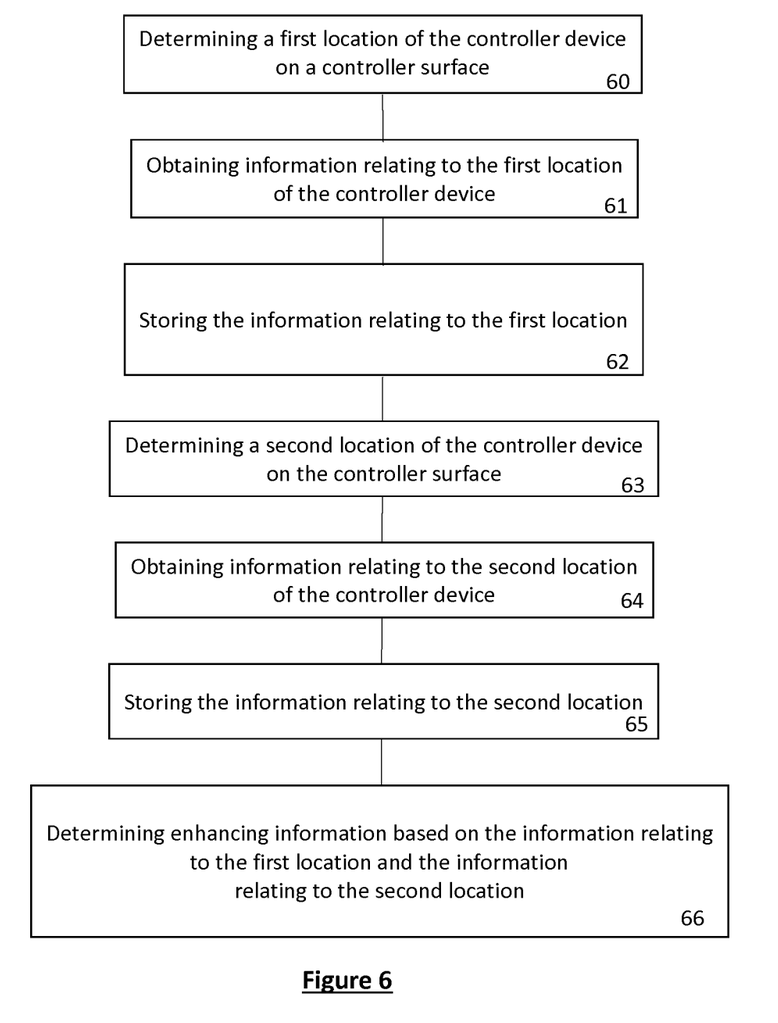
FIG. 6 illustrates a flow chart of a method according to an example embodiment of the invention.

FIG. 6 illustrates an example flow chart of an embodiment of the current invention. In Step 60 first location of the controller device 10 is determined and information relating to the first location obtained, 61. The information relating to the first location is stored, 62. In Step 63 second location of the controller device 10 is determined and information relating to the second location obtained, 64. The information relating to the second location is stored, 65. Step 66 comprises determining enhancing information based on the information relating to the first location and the information relating to the second location.

Figure 7:
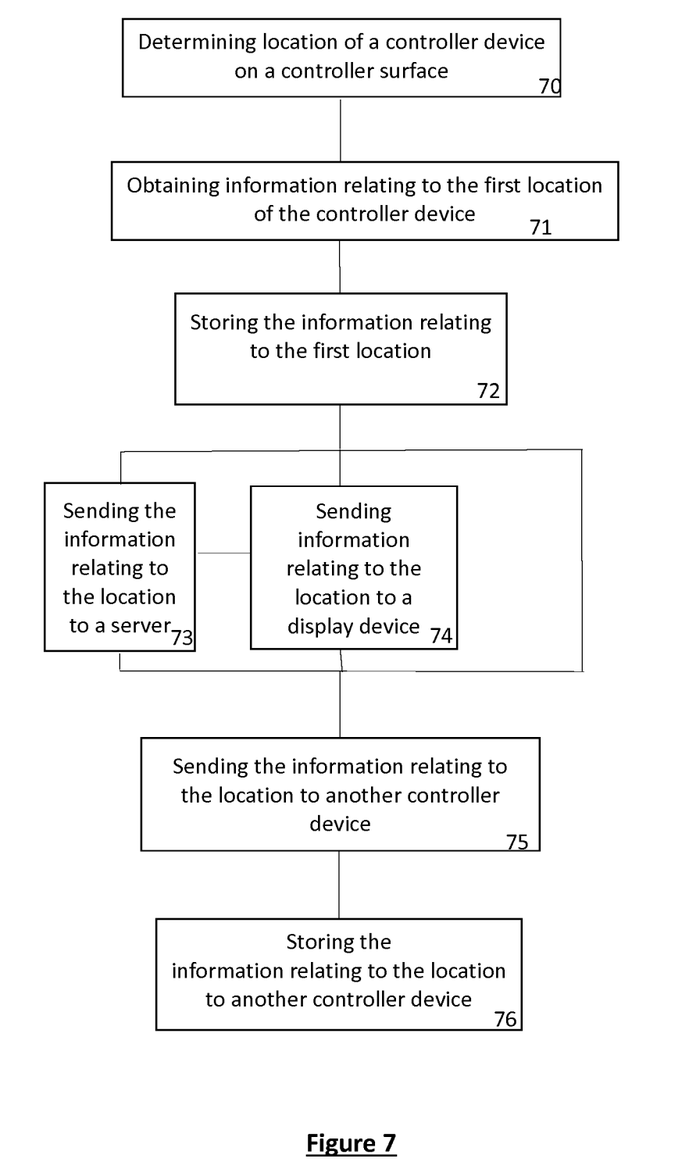
FIG. 7 illustrates a flow chart of a method according to an example embodiment of the invention.

FIG. 7 illustrates an example flow chart of an embodiment in two controller devices 10. In Step 70 location of the controller device 10 is determined. The controller device application 30 receives information from sensor 33 and defines its location. Information relating to the location is obtained, step 71. Information relating to the location is stored on the memory 31 of the controller device 10, Step 72. The information relating to the location is sent using the interface 34 of the controller device 10 to another controller device 10 via server 13, step 73 or via the display device 12, step 74 or directly, step 75. The information relating to the location is stored on the other controller device 10 and stored in the memory 31.

The information relating to the location may accumulate to contain a lot of history data. The history data may be valuable and helpful to a user in many appliances. For example a student may gather information for a long time and the information may be used in many ways. For example the enhancing information may be different for users with different history data. If the student for example has indicated mastering certain mathematical calculations by solving those using any of the example methods described in this application more challenging calculations may be offered.

In a gaming example a player may have passed several level in a game application and gathered points, collectibles etc. Such information may be stored in the history data. The enhancing information may be different for players with different history data. If the player for example has already solved some problem in the game a different problem may be offered. Or if the player has not solved some problem already access to a certain content may be declined.

According to an example embodiment the controller surface 11 is a page of a book, which may have multiple pages. In order to determine the current page at least some of the pages may contain at least one NFC tag which contains information like page number or other information identifying current page. Because NFC is based on RFID technology, it is possible that the controller device 10 reads the information from NFC tags in more than one page. In some example embodiments isolating material may be arranged between pages to prevent reading NFC tags from other pages.

According to another embodiment isolating material is not needed if the pages contain at least one NFC tag with page number information and location information. If the location is determined to be on the left page of a spread, the greatest odd page number is the current page. If the location is determined to be on the right page of the spread, the smallest even page number is the current page.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method comprising:
   determining by a controller device a first location of the controller device on a controller surface, wherein the controller device comprises a computing device;
   obtaining, at the first location of the controller device, first data of a computer program, the first data being stored at the first location of the controller surface;
   storing the first data in the controller device;
   determining by the controller device a second location of the controller device on the controller surface;
   obtaining, at the second location of the controller device, second data of the computer program, the second data being stored at the second location of the controller surface;
   storing the second data in the controller device;
   sending the first data and the second second data from the controller device to a display device; and
   determining combined enhancing information based on the first data and the second data, wherein the combined enhancing information comprises a function of the computer program operating on the display device, and wherein the combined enhancing information is only displayed on the display device based on said determining.

2. The method of claim 1, further comprising receiving the first data and the second data at the display device.

3. The method of claim 1, further comprising presenting the combined enhancing information.

4. The method of claim 3, wherein the combined enhancing information is presented on the display device.

5. The method of claim 1, further comprising receiving the first data and the second data in a remote location.

6. The method of claim 5, where the remote location is a server.

7. The method of claim 1, further comprising storing the first data and second data in an add-on part attachable to the controller device.

8. A system comprising:
   a controller surface, wherein the controller surface contains location information and stores at least first data of a computer program at a first location of the controller surface, and second data of the computer program at a second location of the controller surface;
   a controller device comprising a computing device, wherein the controller device determines its first location on the controller surface, obtains and stores in the controller device the first data of the computer program stored at the first location,
   wherein the controller device further determines its second location on the controller surface, obtains and stores in the controller device the second data of the computer program stored at the second location,
   wherein the controller device sends the first data and the second data to a display device, and
   wherein the display device determines combined enhancing information based on the first data and the second data, wherein the combined enhancing information comprises a function of the computer program operating on the display device, and wherein the combined enhancing information is only displayed on the display device based on said determining.

9. The system of claim 8, further comprising:
   a server, wherein the server stores the first data and the second data.

10. The system of claim 8, further comprising:
    an add-on part attachable to the controller device, wherein the add-on part stores the first data and the second data.

11. A non-transitory computer medium encoding instructions which, when executed by one or more processors, cause an apparatus to at least perform the steps of:
    determining by a controller device a first location of the controller device on a controller surface, wherein the controller device comprises a computing device;
    obtaining, at the first location of the controller device, first data of a computer program, the first data being stored at the first location of the controller surface;
    storing the first data in the controller device;
    determining by the controller device a second location of the controller device on the controller surface;
    obtaining, at the second location of the controller device, second data of the computer program, the second data being stored at the second location of the controller surface;
    storing the second data in the controller device;
    sending the first data and the second data from the controller device to a displace device; and
    determining combined enhancing information based on the first data and the second data, wherein the determining combined enhancing information includes a function of the computer program operating on the display device, wherein the combined enhancing information is only displayed on the display device based on said determining.

12. The method according to claim 1, further comprising:
    communicating with an accessory comprising accessory information, wherein the determining of the combined enhancing information is based on the accessory information.

13. The system according to claim 8, further comprising:
    an accessory comprising accessory information configured to communicate with the controller device, wherein the determining of the combined enhancing information is based on the accessory information.

14. The non-transitory computer medium encoding instructions according to claim 11, which when executed by one or more processors, cause an apparatus to at least perform the steps of:
    communicating with an accessory comprising accessory information, wherein the determining of the combined enhancing information is based on the accessory information.

* * * * *